United States Patent
Park et al.

(10) Patent No.: US 12,305,002 B2
(45) Date of Patent: May 20, 2025

(54) POLYIMIDE-BASED FILM AND WINDOW COVER FILM USING SAME

(71) Applicants: SK Innovation Co., Ltd., Seoul (KR); SK ie technology Co., Ltd., Seoul (KR)

(72) Inventors: Minsang Park, Daejeon (KR); Hye Ri Kim, Daejeon (KR); Hyejin Kim, Daejeon (KR); Jinsu Park, Daejeon (KR); Seungmin Jeong, Daejeon (KR); Yeongmin Jo, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 612 days.

(21) Appl. No.: 17/764,678

(22) PCT Filed: Sep. 29, 2020

(86) PCT No.: PCT/KR2020/013326
§ 371 (c)(1),
(2) Date: Mar. 29, 2022

(87) PCT Pub. No.: WO2021/066516
PCT Pub. Date: Apr. 8, 2021

(65) Prior Publication Data
US 2022/0315702 A1 Oct. 6, 2022

(30) Foreign Application Priority Data
Sep. 30, 2019 (KR) .................. 10-2019-0120519

(51) Int. Cl.
*C08G 73/10* (2006.01)
*C08J 5/18* (2006.01)
*C08J 7/04* (2020.01)
*G02B 1/04* (2006.01)
*G02B 1/10* (2015.01)

(52) U.S. Cl.
CPC ............ *C08G 73/1039* (2013.01); *C08J 5/18* (2013.01); *C08J 7/04* (2013.01); *G02B 1/04* (2013.01); *G02B 1/10* (2013.01); *C08J 2333/24* (2013.01)

(58) Field of Classification Search
CPC .... C08G 73/14; C08J 5/18; C08J 7/04; G02B 1/04; G02B 1/10
See application file for complete search history.

(56) References Cited

U.S. PATENT DOCUMENTS

| | | |
|---|---|---|
| 2016/0040027 A1 | 2/2016 | Woo et al. |
| 2016/0222166 A1* | 8/2016 | Ahn .................. C08G 73/1039 |
| 2018/0086939 A1* | 3/2018 | Kato ...................... G06F 3/041 |
| 2019/0077915 A1 | 3/2019 | Yun et al. |
| 2019/0256659 A1 | 8/2019 | Kalinina et al. |
| 2019/0375894 A1 | 12/2019 | Sakayori et al. |

FOREIGN PATENT DOCUMENTS

| | | | |
|---|---|---|---|
| JP | 2018203906 A | * | 12/2018 |
| KR | 1020140120058 A | | 10/2014 |
| KR | 1020160113754 A | | 10/2016 |
| KR | 1020170131217 A | | 11/2017 |
| KR | 1020170136285 A | | 12/2017 |
| KR | 1020180018306 A | | 2/2018 |
| KR | 1020180018307 A | | 2/2018 |
| KR | 1020190039180 A | | 4/2019 |
| KR | 1020190101213 A | | 8/2019 |
| KR | 102147342 B1 | | 8/2020 |

* cited by examiner

*Primary Examiner* — Gregory Listvoyb
(74) *Attorney, Agent, or Firm* — The Webb Law Firm

(57) ABSTRACT

The present invention relates to a polyimide-based film exhibiting excellent visibility, a method for preparing same, and a display device including the prepared film. Particularly, the present invention relates to a polyimide-based film, a window cover film, and a display panel including same. The polyimide-based film maintains linear polarization with respect to incident polarization in the direction of an inclination as well as incident polarization in the direction of a normal line of the film.

10 Claims, 7 Drawing Sheets

(a)

(b)

Incident angle 0°   Incident angle 20°   Incident angle 50°

Example 1

Comparative Example 1

450nm

550nm

650nm

POLYIMIDE-BASED FILM AND WINDOW COVER FILM USING SAME

CROSS-REFERENCE TO RELATED APPLICATIONS

This application is the United States national phase of International Application No. PCT/KR2020/013326 filed Sep. 29, 2020, and claims priority to Korean Patent Application No. 10-2019-0120519 filed Sep. 30, 2019, the disclosures of which are hereby incorporated by reference in their entirety.

BACKGROUND OF THE INVENTION

Field of the Invention

The present invention relates to a polyimide-based film and a window cover film using the same.

Description of Related Art

Display devices include a film such as a window cover provided on a display panel in order to protect the display panel from a scratch or an external impact and configured to be transparent so that a user may view a display unit from the display panel.

Examples of such a type of film include a window cover manufactured from a polymer film having high hardness, high rigidity, and flexible properties instead of tempered glass, as display devices are gradually becoming lighter, thinner, and more flexible.

Although a polyimide-based film is sometimes used as an example of a material having such a use, such a transparent polyimide-based film for a flexible display (used as a generic term for a polyimide or polyamide-imide film) has a structure in which retardation itself occurs seriously. In addition, when polarized light passes, a problem of visibility such as rainbow mura due to the retardation is recognized as a major problem. Therefore, for example, when viewing the display while wearing sunglasses using a polarization phenomenon, a large distortion phenomenon in visibility is caused.

As shown in FIG. 1, such a rainbow phenomenon is caused by a polarization color phenomenon that occurs by interference with each other because rotatory polarization of the retarded polarized light is not maintained.

In addition, since such a window cover film made of such a polyimide-based resin is formed on the outermost side of the display device, it is important to have a high display quality and to prevent distortion due to light, such as a mura phenomenon, a blackout phenomenon in which a screen looks black at a specific angle, or a rainbow phenomenon having a rainbow mura, from being generated. As a solution to this problem, it is also important to provide a film with a low in-plane retardation (Rin) of the film and excellent uniformity of retardation.

Moreover, as a coating layer is laminated on a substrate layer in order to impart various physical properties to the window cover film, scattered reflection of light is caused, an optical mura occurs, which deteriorates visibility and causes eye fatigue when applied to a display. One of the methods to solve this problem is to maintain the rotatory polarization as much as possible for the phase of incident polarized light passing through the polyimide-based film, which is a base layer. To this end, it is necessary to minimize the occurrence of circular retardance of the film, and through this, it is possible to develop a polyimide-based film with improved visibility.

That is, various polymer window cover materials have been developed to replace expensive tempered glass, but there is a need to develop a window cover film capable of solving a distortion problem caused by polarized light.

In addition, it is also important to provide a film with a low in-plane retardation (Rin) of the film and excellent uniformity of retardation.

SUMMARY OF THE INVENTION

An object of the present invention is to provide a polyimide-based film maintaining linear retardance for retardation occurring not only for incident polarized light in a normal direction of the film, but also for incident polarized light in an inclined direction, a window cover film, and a display panel including the same.

Another object of the present invention is to provide a novel polyimide-based film in which the accumulated circular retardation (CR) is minimized for incident polarized light in an inclined direction of the normal of the film, a window cover film using the same, and a display panel including the same.

Another object of the present invention is to provide a polyimide-based film without a rainbow phenomenon by maintaining rotary polarization for incident polarized light, a window cover film, and a display panel including the same.

Another object of the present invention is to provide a polyimide film used for optical purposes, such as for window covers, which is free from optical mura such as rainbow phenomenon and mura phenomenon depending on the viewing angle, and has excellent optical properties such as visibility, and a display device including the same.

Another object of the present invention is to provide a polyimide-based film having surface properties of alowin-plane retardation (Rin) and excellent uniformity of retardation, a window cover film, and a display panel including the same.

Another object of the present invention is to provide a polyimide-based film with improved visibility, having a circular retardance value of −30° to 30° when an incident polarization state passes through the polyimide-based film of the present invention.

Preferably, another object of the present invention is to provide a polyimide-based film with a significantly improved visibility, having a circular retardance (CR) value of −10° to 10°.

More preferably, another object of the present invention is to provide a polyimide-based film with completely improved visibility without occurrence of rainbow and mura phenomena, having a circular retardance value of −1° to 1°.

In addition, another object of the present invention is to provide a film with excellent film surface properties, having in-plane retardation (Rin) of the film of 500 nm or less, and the uniformity of retardation of 20% or less.

In addition, another object of the present invention is to provide a display device having excellent visibility, including the improved polyimide-based film having excellent visibility.

Another object of the present invention is to provide a polyimide-based film having significantly improved rainbow phenomenon and a method for manufacturing the same.

Specifically, in the case of a conventional polyimide film used for optical purposes, circular retardance (CR) for incident polarized light occurs significantly so that when used as an optical film, depending on the viewing angle or when viewing the screen using polarized light while wearing sunglasses, it is a problem in viewing angle properties such as overlapping or rainbow phenomenon. This phenomenon causes a conventional polyimide-based film to have a CR of −100° to 100° for polarized light, and even if improved, conventionally, the CR remains in the range of −50° to 50°, which makes this phenomenon more prominent.

In addition, another object of the present invention is to provide a film with surface properties having a low in-plane retardation (Rin) affecting optical properties and surface properties, etc., and having excellent uniformity of retardation.

In one general aspect, there is provided a polyimide-based film of which a circular retardance value with respect to an omnidirectional angle of 0° to 360° is −30° to 30° when incident light passes through the polyimide-based film in a state in which a tilt angle of linear polarization of the incident light with respect to a thickness direction of the polyimide-based film is 0 to 60°.

The circular retardance value may be −10° to 10°.

The circular retardance value may be −1° to 1°.

The polyimide-based film may have in-plane retardation (Rin) of 500 nm or less as measured at 400 nm to 800 nm using an Axoscan equipment, and uniformity of the in-plane retardation within ±20%.

The polyimide-based film may have uniformity within ±10%.

The polyimide-based film may have a modulus of 3 GPa or more and an elongation at break of 8% or more as measured according to ASTM D822, and a light transmittance of 5% or more measured at 388 nm, a total light transmittance of 87% or more measured at 400 to 700 nm, a haze of 2.0% or less, a yellowness of 5.0 or less, and a b* value of 2.0 or less as measured according to ASTM D1746.

The polyimide-based film may have a polyamide-imide structure.

The polyimide-based film may include a unit derived from a fluorine-based aromatic diamine, a unit derived from an aromatic dianhydride, and a unit derived from an aromatic diacid dichloride.

The polyimide-based film may further include a unit derived from a cycloaliphatic dianhydride.

The polyimide-based film may have a thickness of 30 to 110 μm.

In another general aspect, a window cover film includes: the polyimide-based film as described above, and
a coating layer formed on the polyimide-based film.

The coating layer may be any one or more selected from a hard coating layer, an anti-static layer, an anti-fingerprint layer, an anti-fouling layer, an anti-scratch layer, a low refractive layer, an anti-reflection layer, and an impact absorbing layer.

In another general aspect, there is provided a flexible display panel including the polyimide-based film as described above.

One aspect of the present invention may provide a novel polyimide-based film in which a linear retardance is maintained not only for incident light in the normal direction but also for incident light from an inclined direction inclined from the normal direction, and a method for manufacturing the same.

Accordingly, one aspect of the present invention may provide a polyimide-based film with improved visibility, having a circular retardance value of −30° to 30° with respect to an omnidirectional angle of 0 to 360° when polarized light having an incident angle of 0 to 50° is passed through the polyimide-based film of the present invention.

Preferably, one aspect of the present invention may provide a polyimide-based film with a significantly improved visibility, having a circular retardance (CR) value of −10° to 10°.

More preferably, one aspect of the present invention may provide a polyimide-based film with completely improved visibility without occurrence of rainbow and mura phenomena, having a circular retardance value of −3° to 3°.

Most preferably, one aspect of the present invention may provide a polyimide-based film with completely improved visibility without occurrence of rainbow and mura phenomena, having a circular retardance value of −1° to 1°.

In addition, the present invention may provide a film with excellent film surface properties, having in-plane retardation (Rin) of the film of 500 nm or less, and the uniformity of the retardation within ±20%.

In addition, the window cover film may also be characterized in that it has the properties of a modulus of 3 GPa or more and an elongation at break of 8% or more as measured according to ASTM D882, and a light transmittance of 5% or more measured at 388 nm, a total light transmittance of 87% or more measured at 400 to 700 nm, a haze of 2.0% or less, a yellowness of 5.0 or less, and a b* value of 2.0 or less as measured according to ASTM D1746.

In addition, one aspect of the present invention may provide a display device having excellent visibility, including the improved polyimide-based film having excellent visibility.

In addition, one aspect of the present invention may provide a polyimide-based film having significantly improved rainbow phenomenon and a method for manufacturing the same.

Specifically, in the case of a conventional polyimide-based film used for optical purposes, circular retardance (CR) for incident polarized light occurs significantly so that when used as an optical film, depending on the viewing angle, there is a problem in viewing angle properties such as rainbow phenomenon. This phenomenon makes a conventional polyimide-based film have a CR of −100° to 100° at a specific azimuth for polarized light, in some cases −200° to 200°, which makes this phenomenon more pronounced, and also the degree of in-plane (Rin) retardation and the uniformity of the retardation are not good. Therefore, the technical significance of the effect of the present invention should be further emphasized.

BRIEF DESCRIPTION OF THE DRAWINGS

FIG. 2 is a Poincare sphere for polarized light incident perpendicularly to a normal slope of the film according to Example 1, FIG. 3 is a Poincare sphere for polarized light incident perpendicularly on a normal slope of the film according to Comparative Example 1, and a polarization state for each wavelength of incident light, and FIG. 4 is a Poincare sphere measured at incident angles of 0°, 20° and 50° according to Comparative Example 4.

DESCRIPTION OF THE INVENTION

Figure 1:
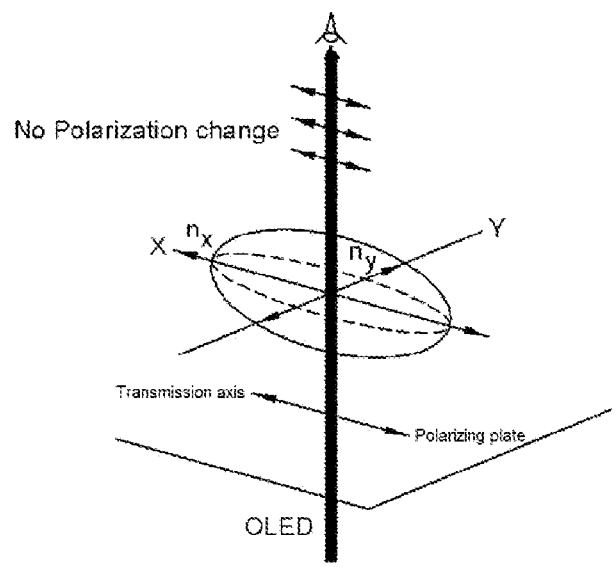
FIGS. 1(a) and (b) are conceptual diagrams for measuring CR of incident polarized light. It illustrates that polarization change occurs at an inclined angle as illustrated in FIG. 1(b).
Figure 1:
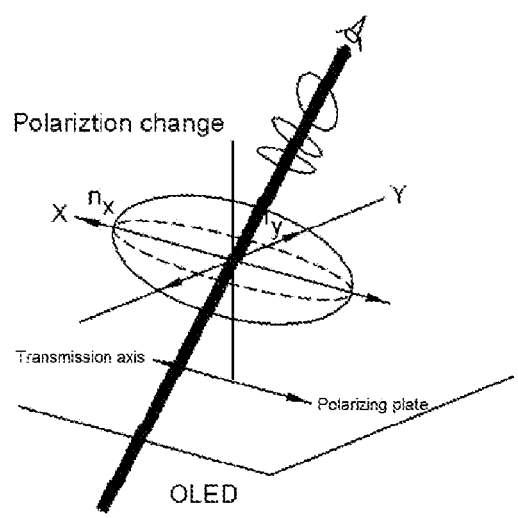
Figure 2:
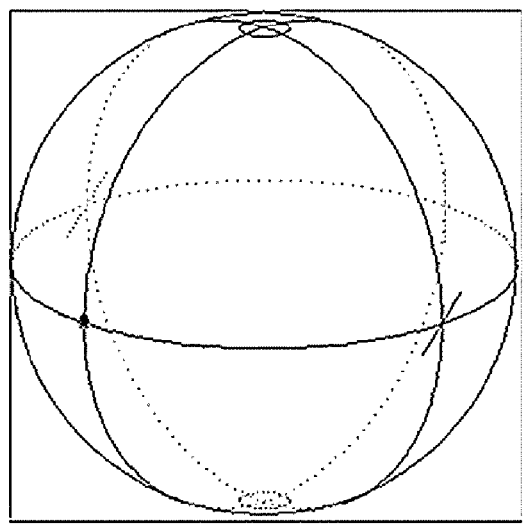
FIGS. 2 to 4 each illustrate a Poincare sphere. The Poincare sphere is a three-dimensional map that describes a polarization state, and represents the polarization state of linear polarization with an ellipticity of 0 on the equator of the sphere.

Hereinafter, the present invention will be described in more detail through the accompanying drawings and Examples.

The following drawing and Examples are only a reference for describing the present invention in detail, and the present invention is not limited thereto and may be implemented in various forms.

In addition, all technical terms and scientific terms have the same meanings as those commonly understood by a person skilled in the art to which the present invention pertains unless otherwise defined. The terms used in the description of the present invention are only for effectively describing certain embodiments, and are not intended to limit the present invention.

Throughout the present specification describing the invention, unless explicitly described to the contrary, "comprising" any component will be understood to imply the further inclusion of other elements rather than the exclusion of other elements.

In addition, singular forms used in the detailed description and the claims are intended to include the plural forms unless otherwise indicated in context.

"Polyimide-based resin" used herein includes polyimide or polyamide-imide. The same goes for "polyimide-based film."

"Polyamic acid solution" used herein has the same meaning as "polyamic acid resin composition."

"Polyimide-based resin solution" used herein has the same meaning as "composition for forming the polyimide-based film" and "polyamide-imide solution". In addition, the polyimide-based resin and a solvent may be included in order to form a polyimide-based film.

A "plurality of drying regions" used herein means that the number of drying regions is two or more, and may be expressed as a first drying region, a second drying region, etc., from a first drying region for convenience. More specifically, the plurality of drying regions may be, but are not limited to, two to ten drying regions, and more specifically three to seven drying regions. In addition, for example, when the number of drying regions is two, a "drying region positioned at a rear end" refers to a second drying region, and a "drying region positioned immediately before the second drying region" refers to a first drying region. When the number of drying regions is three or more, a "drying region positioned at a rear end" refers to a second drying region, a third drying region, etc., except for a first drying region. A "final drying region" refers to a final section of a drying step.

A "plurality of stretching regions" used herein means that the number of stretching regions is two or more, and may be expressed as a first stretching region, a second stretching region, etc., from a first stretching region for convenience. More specifically, the plurality of drying regions may be, but are not limited to, two to ten drying regions, and more specifically three to seven stretching regions. In addition, the stretching region means that a film is uniaxially stretched in a width direction or is biaxially stretched in a width direction and a film advance direction.

A "film" used herein is obtained by applying and drying the "polyimide-based resin solution" onto a base and peeling it off from the base, and it may be stretched or unstretched. In addition, it may be 10 to 500 μm, preferably 20 to 250 μm, and more preferably 30 to 150 μm, but the present invention is not limited thereto.

Hereinafter, the present invention will be described.

The inventors of the present invention have conducted a lot of studies to solve the problems of the conventional window cover film using a polyimide-based resin having a retardation effect on linear polarization, the occurrence of in-plane retardation, and the degree of uniformity on various optical properties.

As a result, the inventors have found that the above problems may be solved by adopting a specific process when manufacturing a window cover film for a display using a polyimide-based resin, and in particular, this phenomenon may be remarkably solved, especially in a polyimide-based film containing a fluorine atom and an aliphatic ring structure, and thus the present invention has been completed.

In one aspect of the present invention, it is possible to provide a new polyimide-based window cover film that solves problems such as the problem of circular retardance for polarization or maintaining the in-plane retardation (Rin) low and uniform, which have been conventional problems in polyimide-based optical films.

In addition, the present invention has been completed by confirming that the problems of viewing angles such as rainbow and mura phenomenon may be solved in the optical film manufacturing step of the polyimide-based polymer without changing or modifying the material.

In particular, the present invention is maximized in a film of a polyimide-based structure that increases transparency and reduces yellowness by including a monomer containing a fluorine element and an alicyclic structure, which has a great technical advantage in solving this problem.

In addition, the present invention may impart another technical meaning in providing a window cover film having polarization properties and retardation properties while the film has a modulus of 3 GPa or more and an elongation at break of 8% or more as measured according to ASTM D882, and a light transmittance of 5% or more measured at 388 nm, a total light transmittance of 87% or more measured at 400 to 700 nm, a haze of 2.0% or less, a yellowness of 5.0 or less, and a b* value of 2.0 or less as measured according to ASTM D1746 at the same time.

It was surprisingly found from the present invention that the polyimide-based window cover film having the above physical properties may be obtained by specifically adjusting the conditions of the application step, the drying step, and the stretching step.

That is, one aspect of the present invention for solving the above problems adopts a method for manufacturing a polyimide-based optical film with improved visibility, including a step of discharging and applying a polyimide-based resin solution on a support such as a stainless steel belt, glass, film, etc., through a die, a first drying step partitioned into a plurality of drying regions, and a second drying step (or also referred to as stretching step) of simultaneously performing stretching and drying partitioned into a plurality of regions.

First, the applying step of the present invention will be described.

The present invention may include a step of applying a polyimide-based resin solution to a substrate through a casting die, a drying step partitioned into a plurality of drying regions, and a stretching step of performing drying and stretching at the same time partitioned into a plurality of stretching regions and simultaneously performing shrink and stretching, and thus, may provide a polyimide-based optical film for the purpose of the present invention, having a minimized CR value, a reduced in-plane retardation (Rin) value, improved in-plane retardation uniformity, and remarkably improved visibility.

The step of applying on the support of the application solution to achieve the object of the present invention mentioned above will be further described.

In the present invention, the applying step is a step of applying a resin solution to the base through the casting die. In the applying step, a shear rate generated when the resin solution passes through the die and an air gap, which is a distance from a die lip part to a support surface, are adjusted such that CR and in-plane retardation (Rin) for the purpose of the present invention may also be achieved. At this time, the shear rate is determined by adjusting the discharge amount and the die lip gap, and the air gap is determined by adjusting the height of the die.

In the case of a general polymer solution, the viscosity decreases as the shear rate increases (shear thinning), and it is preferable to maintain a shear rate at a level at which the viscosity decreases when the resin solution flows in the die. In the present invention, by maintaining the distance of the air gap between 0.5 to 15 times, preferably 10 or less times, and even more preferably 5 or less times the thickness of the cast wet film under these conditions, the CR value and in-plane retardation (Rin) properties of the present invention could be easily achieved. As will be seen in the following Examples and Comparative Examples, when the air gap distance is maintained, the present inventors have also completed the present invention by recognizing that the optical properties and physical properties of the film are significantly changed. Although this effect may not be clearly explained in the present invention, it is understood as a phenomenon that occurs when arrangement between polymer chains is broken due to flow turbulence occurring in the solution in the process of discharging the solution through the die according to the distance of the air gap and being cast on the support, but it is not clear.

Next, the drying step will be described.

The first drying step partitioned into the plurality of drying regions having a drying region partitioned into a plurality of drying regions, has drying regions of which a drying region positioned at a rear end is set to have a temperature higher than a temperature of a drying region positioned immediately before this drying region, and drying regions positioned at a rear end except for a first drying region is set to have high temperatures that are the same as or exceed temperatures of drying regions positioned immediately before these drying regions, respectively and is dried. A solvent content of the film dried in the first drying step is adjusted to 10 to 30% by weight and proceeds to a stretching step.

In addition, when a solvent content of the finally dried film is satisfied, it is preferable that drying times in each region (each step) are the same or approximately the same as each other (here, a phrase "approximately the same" refers to a difference within 10% in a drying time from front end) so that there is no polarization retardance.

The meaning that the drying temperature becomes high toward the rear drying region in the abovementioned drying step is that a second drying region of an initial drying region is set to have a temperature higher than that of a first drying region and a temperature of a drying region behind the second drying region is not lower than that of the second drying region. That is, when drying regions after the second drying region are rear drying regions, the rear drying regions may be set to have temperatures that are the same or approximately the same as each other.

Specifically, for example, it is more preferable for the purpose of reproduction and equalization of the same properties of the CR properties to adopt a drying step having four-step or more drying regions. For example, when the drying region is divided into four steps, drying may be performed at 70 to 100° C. for one to five minutes in a first drying region, be performed at 90 to 130° C. for one to five minutes in a second drying region, be performed at 110 to 160° C. for one to five minutes in a third drying region, and be performed at 130 to 160° C. for one to five minutes in a fourth drying region, and the film may be dried at a temperature programmed to be higher than or equal to that of a rear drying region than in a front drying region in each step. Alternatively, the drying is performed at a higher temperature in the second to fourth drying regions except for the first drying region in the first drying region, and temperatures of the second to fourth drying regions are the same each other or gradually rise.

More specifically, the first drying region may be set to have a temperature of 85° C., the second drying region may be set to have a temperature of 115° C., the third drying region may be set to have a temperature of 130° C., and the fourth drying region may be set to have a temperature of 135° C. Alternatively, the first drying region may be set to have a temperature of 85° C., the second drying region may be set to have a temperature of 115° C., the third drying region may be set to have a temperature of 130° C., and the fourth drying region may be set to have a temperature of 130° C.

Hereinafter, the stretching step of the present invention will be described.

In the present invention, after performing a first drying step of performing drying under the above drying conditions, by combining the stretching step (or may be referred to as a second drying step) of performing stretching and drying at the same time, the circular retardance for linear polarization may be significantly decreased, and the degree of in-plane retardation (Rin) may be decreased and the uniformity of retardation may be adjusted.

After the first drying step, the manufactured film is a film having a solvent content of 10 to 30% by weight, and after peeling it off from the support, a stretching step (second drying step) that proceeds simultaneously with stretching is performed.

It is characterized in that the stretching step includes a plurality of steps in which stretching and drying are performed simultaneously, and after stretching at any step, it includes a step of shrinking and stretching at the rear end thereof.

The plurality of steps in the stretching step (second drying step) may be used to mean that the second drying step has a plurality of drying regions, or it may be understood that it has a plurality of stretching regions.

In the present invention, the optical film manufactured after the stretching step has a solvent content of 3% by weight or less, preferably 2% by weight or less, and preferably contains 0.5 to 2%, and may also be designed to improve the adhesion of a coating interface in a process of forming a coating layer such as a hard coating performed thereafter.

In addition, in one aspect of the present invention, the temperature of the first stretching region of the stretching step is preferably adjusted to be 10 to 100° C. higher than the temperature of the last drying region of the first drying step.

In addition, it is characterized in that in the first stretching region of the stretching step, the stretching region at the rear end is set higher than the stretching temperature of the front end in the range of 0° C. to 50° C. to perform stepwise stretching, and after stretching in any stretching region, it has a step of shrinking and stretching in the stretching region including the last stretching region. By adopting such a stretching method, the smoothness of the film may be improved by preventing thermal shock of the optical film, a decrease in the CR value may be further induced by adjusting the micro-arrangement of the optical film, and the in-plane retardation (Rin) may be decreased and the uniformity of the retardation may be improved, so it is more preferred. The temperature of the stretching step is not particularly limited, but it is more preferred to carry out between 150 to 300° C. because the effect of the present invention may be easily achieved.

If described as an example of multi-step stretching in the stretching step of the present invention, for example, it is preferable that the film is not stretched at 145 to 160° C. in first stretching, the film is stretched at 160 to 200° C. by 102% in the second stretching, the film is stretched at 190 to 240° C. by 102% in the third stretching, the film is stretched at 210 to 250° C. by 101% in the fourth stretching, and the film is stretched at 220 to 300° C. by 100.5% in the fifth stretching, and overall, a stretching ratio of less than 2 times, preferably a stretching ratio of 1.2 or less times, and more preferably a stretching ratio of 1.1 times are maintained, in terms of achieving the CR value and the in-plane retardation (Rin) value of the present invention. In the present invention, the stretching ratio means a relative ratio to a machine direction (MD) or a transverse direction (TD) or MD×TD ratio of the film entering the stretching region. That is, the stretching ratio of 110% in the second stretching region means a relative ratio when the length of the film entering the stretching region is set to 100.

In addition, in the stretching step partitioned into the plurality of stretching regions, when the film is stretched to within 2 times, preferably within 1.2 times, and very good, within 1.1 times (110%) of the stretching width until the last stretching area based on the film width of the first stretching area, each of the stretching regions is set to a temperature higher than that of the previous stretching region, and the last stretched region or the two stretched regions from the last stretched to have a stretch width lower than the stretch width of the stretched region located immediately before the stretched region, it is most preferred because it has the excellent CR, the lowest in-plane retardation, and the least variation in retardation uniformity.

In addition, in one aspect of the present invention, in the first drying step, the solvent content of the dried film is adjusted to be 15 to 30% by weight, and in the second drying step, through stretchability and the additional solvent removal of stretching step, although it is not clear, a method for manufacturing a new polyimide-based optical film having significantly changed optical properties by changing the microscopic properties of the polymer molecular arrangement of the polyimide-based film may be provided, and a display device including an optical film having such properties may be provided.

In addition, in one aspect of the present invention, an optical film finally obtained after the stretching step has a solvent content of 3% by weight or less, preferably 2% by weight or less, and preferably 0.5 to 2% by weight, and may be designed to improve the adhesion of the coating interface in the coating process such as the formation of a hard coating layer proceeding at the rear end.

In the present invention, the physical properties of the film subjected to the above applying step, drying step, and stretching step, or the optical film manufactured through an additional drying step or heat treatment step if necessary are as follows.

That is, in one aspect of the present invention, when the optical film passes polarized light through the optical film at an incident angle of 20°, the circular retardance (CR) value, which is a circular retardance value with respect to an omnidirectional angle of 0 to 360°, may be −30° to 30°.

The optical film made of the polyamide-based resin manufactured by a manufacturing process of the present invention provides a polyimide-based optical film with improved visibility having a circular retardance value of −30° to 30° and more specifically, −10° to 10°, which is a circular retardance (CR) value with respect to an omnidirectional angle of 0 to 360°, when polarized light incident between an incident angle of 0 to 50° is passed through the optical film.

In addition, the present invention provides a polyimide-based optical film having an in-plane retardation (Rin) of 500 nm or less and the retardation uniformity of ±20% or less.

Preferably, the polyimide-based optical film having the in-plane retardation (Rin) of 250 nm or less and the retardation uniformity within ±10% is provided. Specifically, the polyimide-based optical film may have a uniformity of 0.01 to 10%, preferably 0.1 to 9%, and more preferably 0.1 to 8%. When the polyamide-imide film having the above uniformity is provided to a display, it is excellent in light uniformity, and thus, high reliability may be secured by preventing non-uniform portions from being formed on the screen display.

In addition, the present invention provides an optical film having a modulus of 3 GPa or more and an elongation at break of 8% or more as measured according to ASTM D882, and a light transmittance of 5% or more measured at 388 nm, a total light transmittance of 87% or more measured at 400 to 700 nm, a haze of 2.0% or less, a yellowness of 5.0 or less, and a b* value of 2.0 or less as measured according to ASTM D1746.

Another aspect of the present invention provides a display device including the optical film according to one aspect of the present invention.

Next, the polyimide-based resin of the present invention will be further described.

One aspect of the present invention is not particularly limited as long as the polyimide-based resin has a birefringence. This is because, when the polyimide-based resin has a birefringence, polarization retardation occurs due to polarization, and thus, it is the technical idea of the present invention to prevent the polarization retardation.

Accordingly, one aspect of the present invention is a polyimide-based (polyimide-based is used as a concept that also includes polyamide-imide) resin having birefringence for optical use, and in particular, in the case of a polyimide-based resin containing a fluorine atom and an aliphatic cyclic structure, which is prepared including a fluorine-based aromatic diamine having excellent optical properties and birefringence and an alicyclic dianhydride, the effect of improving the visibility of the present invention is particularly useful because it exhibits thermal properties, modulus, and excellent optical properties, but is not limited as long as it is an optical polyimide-based resin having a birefringence.

The polyimide-based resin may be derived from, for example, a fluorine-based aromatic diamine, an aromatic dianhydride, and an aromatic diacid dichloride. More preferably, it may be more preferable to use a quaternary copolymer derived from a fluorine-based aromatic diamine, an aromatic dianhydride, a cycloaliphatic dianhydride, and an aromatic diacid dichloride. Specifically, after preparing a polyamic acid containing fluorine-based aromatic diamine, aromatic dianhydride, cycloaliphatic dianhydride, and aromatic diacid dichloride, it may be a resin imidized in the presence of an imidization catalyst and a dehydrating agent at a low temperature of 150° C. or less.

In one aspect of the present invention, the polyimide-based film may have a thickness of 10 to 500 μm, 20 to 250 μm, or 30 to 110 μm.

In addition, in one aspect of the present invention, the polyimide-based film may have a modulus of 3 GPa or more, 4 GPa or more, or 5 GPa or more and an elongation at break of 8% or more, 12% or more, or 15% or more as measured according to ASTM D882, a light transmittance of 5% or more or 5 to 80% measured at 388 nm, a total light transmittance of 87% or more, 88% or more, or 89% or more measured at 400 to 700 nm according to ASTM D1746, a haze of 2.0% or less, 1.5% or less, or 1.0% or less as measured according to ASTM D1003, and a yellowness of 5.0 or less, 3.0 or less, or 0.4 to 3.0 and a b* value of 2.0 or less, 1.3 or less, or 0.4 to 1.3 as measured according to ASTM E313, and thus has excellent physical properties as a window film that may replace the conventional tempered glass or conventional polyimide-based films.

In one aspect of the present invention, the polyimide-based film is a polyimide-based resin, and in particular, is a polyimide-based resin having a polyamide-imide structure.

In addition, the polyimide-based film may be more preferably a polyamide-imide-based resin containing a fluorine atom and an alicyclic structure, and thus may have an excellent appearance quality, mechanical properties and dynamic bending properties while satisfying the scope of the invention, such as the CR value and the in-plane retardation (Rin) value.

In one aspect of the present invention, it is preferred that the polyamide-imide polymer is prepared as an example of the polyamide-imide-based resin containing a fluorine atom and an alicyclic structure by preparing an amine-terminated polyamide oligomer derived from a first fluorine-based aromatic diamine and an aromatic diacid dichloride and then polymerizing the amine-terminated polyamide oligomer with a monomer derived from a second fluorine-based aromatic diamine, an aromatic dianhydride, and a cycloaliphatic dianhydride because the object of the present invention is better achieved. The first fluorine-based aromatic diamine and the second fluorine-based aromatic diamine may be the same or different types.

In one aspect of the present invention, when the amine-terminated oligomer in which an amide structure in a polymer chain is formed by aromatic diacid dichloride, is included as a monomer of a diamine, in addition to the improvement in the optical properties, in particular, mechanical strength including modulus may be improved, and the dynamic bending properties may also be further improved.

In one aspect of the present invention, when having a polyamide oligomer block as described above, a molar ratio between the diamine monomer including an amine-terminated polyamide oligomer and the second fluorinated aromatic diamine, and the dianhydride monomer including the aromatic dianhydride and the cycloaliphatic dianhydride of the present invention, may be preferably 1:0.8 to 1.2, preferably 1:0.9 to 1, and more preferably 1:1. In addition, a content of the amine-terminated polyamide oligomer with respect to the entire diamine monomer is not particularly limited. However, it is more preferable to include 30 mol % or more, preferably 50 mol % or more, and more preferably 70 mol % or more in order to better satisfy the physical properties such as the circular retardance effect and in-plane retardation, and also to satisfy mechanical properties, yellow index, and optical properties of the present invention. In addition, a composition ratio between the aromatic dianhydride and the cycloaliphatic dianhydride is not particularly limited. However, when considering the achievement of transparency, a yellow index, mechanical properties, etc., in addition to the effects of the present invention, it is preferable to use in a ratio of 30 to 80 mol %:70 to 20 mol %, but is not necessarily limited thereto.

In one aspect of the present invention, the polyamide-imide-based resin is more preferable because the polyamide-imide-based resin may use a quaternary copolymer including all of a unit derived from a fluorine-based aromatic diamine, a unit derived from an aromatic dianhydride, a unit derived from a cycloaliphatic dianhydride, and a unit derived from an aromatic diacid dichloride, the target circular retardance and in-plane retardation (Rin) properties may be more satisfied, and appearance quality and optical properties may be satisfied.

In addition, another example of the polyamide-imide-based resin containing a fluorine atom and an alicyclic structure in the present invention may include a polyamide-imide-based resin obtained by mixing, polymerization, and imidization of a fluorine-based aromatic diamine, an aromatic dianhydride, a cycloaliphatic dianhydride, and an aromatic diacid dichloride. Such a resin has a random copolymer structure, may have 40 moles or more, preferably 50 to 80 mol of aromatic diacid dichloride, 10 to 50 mol of aromatic dianhydride, and 10 to 60 mol of cycloaliphatic dianhydride, with respect to 100 moles of the diamine, and may be prepared by polymerizing diacid dichloride and dianhydride in a molar ratio of 1:0.8 to 1.1 with respect to the diamine monomer. Preferably, the resin is polymerized in a molar ratio of 1:1 of diacid dichloride and dianhydride with respect to the diamine monomer. The random polyamide-imide of the present invention may also fall within the scope of the present invention, although there is a slight difference in optical properties and mechanical properties such as circular retardance and in-plane retardation properties and transparency, and mechanical properties, compared to the block-type polyamide-imide resin.

In one aspect of the present invention, the fluorine-based aromatic diamine component may be used in combination with 2,2'-bis(trifluoromethyl)-benzidine and other known aromatic diamine components, but 2,2'-bis(trifluoromethyl)-benzidine may be used alone. Optical properties and a yellow index may be improved based on the mechanical properties of the polyamide-imide film required in the present invention by using such a fluorine-based aromatic diamine. In addition, in the hard coating film, the mechanical strength may be improved and the dynamic bending properties may be further improved by improving a tensile modulus of the polyamide-imide-based film.

The aromatic dianhydride may be, but is not limited to, at least one or a mixture of two or more selected from the group consisting of 4,4'-hexafluoroisopropylidene diphthalic anhydride (6FDA) and biphenyltetracarboxylic dianhydride (BPDA), oxydiphthalic dianhydride (ODPA), sulfonyl diphthalic anhydride (SO2DPA), (isopropylidenediphenoxy) bis (phthalic anhydride) (6HDBA), 4-(2,5-dioxotetrahydrofuran-3-yl)-1,2,3,4-tetrahydronaphthalene-1,2-di carboxylic dianhydride (TDA), 1,2,4,5-benzene tetracarboxylic dianhydride (PMDA), benzophenone tetracarboxylic dianhydride (BTDA), bis(carboxyphenyl) dimethyl silane dianhydride (SiDA), and bis (dicarboxyphenoxy) diphenyl sulfide dianhydride (BDSDA).

The cycloaliphatic dianhydride may be, for example, any one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo [2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof.

In one aspect of the present invention, when the amide structure in the polymer chain is formed by the aromatic diacid dichloride, in addition to the improvement in the optical properties, in particular, mechanical strength including the modulus may be greatly improved, and the dynamic bending properties may also be further improved.

The aromatic diacid dichloride may be, but is not limited to, a mixture of two or more selected from the group consisting of isophthaloyl dichloride (IPC), terephthaloyl dichloride (TPC), 1,1'-biphenyl-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof.

In the present invention, a weight average molecular weight of the polyimide resin is not particularly limited, but may be 200,000 g/mol or more, preferably 300,000 g/mol or more, and more preferably 200,000 to 500,000 g/mol. In addition, a glass transition temperature is not limited, but may be 300 to 400° C., and more specifically 330 to 380° C. The above range is preferred because a film in which a modulus is high, a mechanical strength and optical properties are excellent, and curing occurrence is less may be provided, but the present invention is not necessarily limited thereto.

The polymerization of the present invention includes an organic solvent for solution polymerization. The type of the organic solvent is not particularly limited, and for example, it is preferable to use any one or two or more polar solvents selected from dimethylacetamide (DMAc), N-methyl-2-pyrrolidone (NMP), dimethylformamide (DMF), dimethyl sulfoxide (DMSO), acetone, ethyl acetate, m-cresol, etc.

Hereinafter, a method for preparing a polyamide-imide solution containing a block-type polyamide-imide will be described in more detail.

The polyimide-based film may be manufactured including: preparing an oligomer by reacting a fluorine-based aromatic diamine with an aromatic diacid dichloride, preparing a polyamic acid solution by reacting the prepared oligomer with a fluorinated aromatic diamine, an aromatic dianhydride, and a cycloaliphatic dianhydride, preparing a polyamide-imide resin by imidizing the polyamic acid solution, and preparing a polyamide-imide solution in which the polyamide-imide resin is dissolved in an organic solvent.

The preparing of the oligomer may include: reacting a fluorine-based aromatic diamine with an aromatic diacid dichloride in a reactor, and purifying and drying the obtained oligomer. In this case, the fluorine-based aromatic diamine may be added in a molar ratio of 1.01 to 2 compared to the aromatic diacid dichloride, and an amine-terminated polyamide oligomer monomer may be prepared. A molecular weight of the oligomer monomer is not particularly limited, but for example, when the weight average molecular weight is in the range of 1000 to 3000 g/mol, more excellent physical properties may be obtained.

In addition, it is preferable to use an aromatic carbonyl halide monomer such as terephthaloyl chloride or isophthaloyl chloride, not terephthalic acid ester or terephthalic acid itself in order to introduce the amide structure. It seems that a chlorine element affects the physical property of the film, but it is not clear.

Next, the preparing of the polyamic acid solution may be performed through a solution polymerization of reacting the prepared oligomer with a fluorine-based aromatic diamine, an aromatic dianhydride, and a cycloaliphatic dianhydride in an organic solvent. Here, the organic solvent used for the polymerization may be, for example, any one or two or more polar solvents selected from the group consisting of dimethylacetamide (DMAc), N-methyl-2-pyrrolidone (NMP), dimethylformamide (DMF), dimethylsulfoxide (DMSO), ethyl cellosolve, methyl cellosolve, acetone, ethylacetate, and m-cresol.

Next, the preparing of the polyamide-imide resin by imidizing the polyamic acid solution may be performed through chemical imidization, and it is more preferable that the polyamic acid solution is chemically imidized using pyridine and acetic anhydride. Subsequently, the imidization may be performed at a low temperature of 150° C. or less, preferably 100° C. or less, and specifically 50 to 150° C. using an imidization catalyst and a dehydrating agent.

This method makes it possible to impart uniform mechanical property to the entire film as compared to an imidization reaction by heat at a high temperature.

The imidization catalyst may be any one or two or more selected from the group consisting of pyridine, isoquinoline, and β-quinoline. In addition, the dehydrating agent may be any one or two or more selected from the group consisting of acetic anhydride, phthalic anhydride, and maleic anhydride, but is not necessarily limited thereto.

In addition, the polyamide-imide resin may be prepared by mixing an additive such as flame retardants, adhesion enhancers, inorganic particles, antioxidants, UV inhibitors, and plasticizers in the polyamic acid solution.

In addition, after imidization, the resin may be purified using the solvent to obtain a solid content, and the resulting solid may be dissolved in the solvent to obtain a polyamide-imide solution. The solvent may include, but is not limited to, for example, N,N-dimethylacetamide (DMAc), etc.

<Window Cover Film Having Coating Layer Formed Thereon and Method for Manufacturing the Same>

Another aspect of the present invention provides a window cover film including the above-described polyimide-based film; and a coating layer formed on the polyimide-based film.

When a coating layer is laminated on a polyimide-based film having a change rate of surface hardness in a specific range, it is possible to provide a window cover film in which visibility is significantly improved and the number of contour lines is not inferior.

In one aspect of the present invention, the window cover film having the hard coating layer may satisfy all physical properties of a light transmittance of 3% or more at 388 nm and a total light transmittance of 87% or more, 88% or more, or 89% or more at 400 to 700 nm as measured according to ASTM D1746, a haze of 1.5% or less, 1.2% or less, or 1.0% or less as measured according to ASTM D1003, and a yellow index of 4.0 or less, 3.0 or less, or 2.0 and a b* value of 2.0 or less, 1.5 or less, or 1.2 or less as measured according to ASTM E313.

According to one aspect of the present invention, the present invention may provide a window cover film in which various coating layers for imparting the functionality of the window cover film are formed in addition to the hard coating layer or with the hard coating layer.

For a specific example, the coating layer may include, but is not limited to, any one or more layers selected from a hard coating layer, a restoration layer, an impact diffusion layer, a self-cleaning layer, an anti-fingerprint layer, an anti-scratch layer, alow refractive index layer, and an impact absorbing layer.

Even though various coating layers as described above are formed on the polyimide-based film of the present invention, it is possible to provide the window cover film in which a display quality is excellent, optical properties are excellent, and in particular, a rainbow phenomenon is significantly reduced.

In one aspect of the present invention, specifically, the coating layer may be formed on one surface or both surfaces of the polyimide-based film. For example, the coating layer may be disposed on an upper surface of the polyimide-based film or may be disposed on each of upper and lower surfaces of the polyimide-based film. The coating layer may protect the polyimide-based film having excellent optical and mechanical properties from external physical or chemical damage.

In one aspect of the present invention, the coating layer may be formed to have a solid content of 0.01 to 200 $g/m^2$ with respect to the total area of the polyimide-based film. The coating layer may preferably be formed to have a solid content of 20 to 200 $g/m^2$ with respect to the total area of the polyimide-based film. The above-described basis weight is provided, such that surprisingly, a rainbow phenomenon does not occur while maintaining functionality. Thus, excellent visibility may thus be implemented.

In one aspect of the present invention, specifically, the coating layer may be formed by applying a composition for forming a coating layer including a coating solvent onto the polyimide-based film.

The coating solvent is not particularly limited, but may preferably be a polar solvent. The polar solvent may be, for example, any one or more solvents selected from the group consisting of ether-based solvents, ketone-based solvents, alcohol-based solvents, amide-based solvents, sulfoxide-based solvents, and aromatic hydrocarbon-based solvents. Specifically, the polar solvent may be any one or more solvents selected from the group consisting of dimethylacetamide (DMAc), N-methyl-2-pyrrolidone (NMP), dimethylformamide (DMF), dimethylformsulfoxide (DMSO), acetone, ethylacetate, propylene glycol methyl ether, m-cresol, methanol, ethanol, isopropanol, butanol, 2-methoxyethanol, methyl cellosolve, ethyl cellosolve, methyl ethyl ketone, methyl butyl ketone, methyl isobutyl ketone, methyl phenyl ketone, diethyl ketone, dipropyl ketone, cyclohexanone, hexane, heptane, octane, benzene, toluene, and xylene.

In one aspect of the present invention, for forming the coating layer, a method of forming the coating layer by applying the composition for forming a coating layer on the polyimide-based film may include, but is not limited to, for example, any one or more methods selected from a s spin coating method, an immersion method, a spray method, a die coating method, a bar coating method, a roll coater method, a meniscus coating method, a flexo printing method, a screen printing method, a bead coating method, an air knife coating method, a reverse roll coating method, a blade coating method, a casting coating method, and a gravure coating method.

In one aspect of the present invention, the coating layer may preferably be a hard coating layer. The hard coating layer may include any one or more selected from the group consisting of an organic material and an inorganic material. For example, the organic material includes carbon, and may include any one or more selected from non-metal elements such as hydrogen, oxygen, and nitrogen, based on the carbon. The inorganic material refers to a material other than the organic material, and may include any one or more selected from metal elements such as alkaline earth metals, alkali metals, transition metals, post-transition metals and metalloids. The inorganic material may include, for example, carbon dioxide, carbon monoxide, diamond, carbonate, etc., as an exception.

In one aspect of the present invention, the hard coating layer may be an organic material layer or an inorganic material layer alone, or may be a mixed layer of the organic and inorganic materials. The hard coating layer is not particularly limited, but may preferably include 10 to 90% by weight of the organic material and 10 to 90% by weight of the inorganic material. The hard coating layer may preferably include 40 to 80% by weight of the organic material and 20 to 60% by weight of the inorganic material. As described above, even though the hard coating layer including the organic and inorganic materials is formed, distortion due to light does not occur while having an excellent bond with the polyimide-based film, and in particular, the effect of preventing a rainbow phenomenon is excellent.

In one aspect of the present invention, the hard coating layer is not particularly limited, but may be, for example, a layer including any one or more polymers selected from the group consisting of an acrylic polymer, a silicone polymer, an epoxy polymer, and a urethane polymer.

Specifically, the hard coating layer may be formed from a composition for forming the coating layer including an epoxy siloxane resin in order to prevent deterioration of the optical properties and improve surface hardness, when the hard coating layer is formed on the polyimide-based film. Specifically, the epoxysiloxane resin may be a siloxane resin having an epoxy group. The epoxy group may be a cyclic epoxy group, an aliphatic epoxy group, an aromatic epoxy group, or a combination thereof. The siloxane resin may be a polymer compound in which a silicon atom and an oxygen atom are covalently bonded.

For example, the epoxysiloxane resin may preferably be a silsesquioxane resin. Specifically, in the silsesquioxane compound, a silicon atom may be directly substituted with an epoxy group, or a substituent in which the silicon atom is substituted may be substituted with an epoxy group. A non-limiting example may include a silsesquioxane resin in which a 3,4-epoxycyclohexyl group or a glycidoxy group is substituted.

The epoxysiloxane resin may be prepared by alone alkoxysilane having the epoxy group in the presence of water, or may be prepared through a hydrolysis and condensation reaction between an alkoxysilane having the epoxy group and a heterogeneous alkoxysilane. In addition, the epoxysiloxane resin may be formed by polymerizing a silane compound having an epoxycyclohexyl group.

For example, the alkoxysilane compound having the epoxy group may be any one or more selected from the group consisting of 2-(3,4-epoxycyclohexyl)ethyltrimethoxysilane, 2-(3,4-epoxycyclohexyl)ethyltriethoxysilane, and 3-glycidoxypropyltrimethoxysilane.

In one aspect of the present invention, the epoxysiloxane resin may have, but is not limited to, a weight average molecular weight of 1,000 to 20,000 g/mol. When the epoxysiloxane resin has the weight average molecular weight in the above range, it has an appropriate viscosity, such that it is possible to improve a flowability, a coating property, a curing reactivity, etc. of the composition for forming the coating layer, and it is possible to improve surface hardness of the hard coating layer.

In one aspect of the present invention, the epoxysiloxane resin may be included in an amount of 20 to 65% by weight, preferably 20 to 60% by weight with respect to the total weight of the composition for forming the coating layer. When the epoxy siloxane resin is included in the above range, it is possible to improve the surface hardness of the hard coating layer, and to induce uniform curing to prevent a physical defect such as a crack due to partial overcuring.

In one aspect of the present invention, the composition for forming the coating layer may further include a crosslinking agent and an initiator.

Specifically, the crosslinking agent is not particularly limited as long as it can form a crosslinking bond with the epoxysiloxane resin to solidify the composition for forming the coating layer and improve the hardness of the hard coating layer. However, the crosslinking agent may be, for example, any one or more selected from the group consisting of (3,4-epoxycyclohexyl)methyl-3',4'-epoxycyclohexanecarboxylate, diglycidyl 1,2-cyclohexanedicarboxylate, 2-(3,4-epoxycyclohexyl-5,5-spiro-3,4-epoxy)cyclohexane-meta-dioxane, bis (3,4-epoxycyclohexylmethyl)adipate), bis (3,4-epoxy-6-methylcyclohexyl)adipate, 3,4-epoxy-6-methylcyclohexylmethyl-3',4'-epoxy-6'-methylcyclohexanecarboxylate, 1,4-cyclohexanedimethanol bis(3,4-epoxycyclohexanecarboxylate), ethylenebis(3,4-epoxycyclohexanecarboxylate), 3,4-epoxycyclohexylmethyl (meth)acrylate, bis(3,4-epoxycyclohexylmethyl)adipate, 4-vinylcyclohexenedioxide, vinylcyclohexene monooxide, 1,4-cyclohexanedimethanol diglycidyl ether, and 2,2'-((1-methylethylidene)bis(cyclohexane-4,1-diyloxymethylene)) bisoxirane. Preferably, the crosslinking agent may be any one or more selected from the group consisting of (3,4-epoxycyclohexyl)methyl-3',4'-epoxycyclohexanecarboxylate and bis(3,4-epoxycyclohexylmethyl)adipate containing a compound to which two 3,4-epoxycyclohexyl groups are linked.

In one aspect of the present invention, a content of the crosslinking agent is not particularly limited, and may be, for example, 5 to 150 parts by weight with respect to 100 parts by weight of the epoxysiloxane resin. In addition, according to an aspect of the present invention, the crosslinking agent may be included in an amount of 3 to 30% by weight and preferably 5 to 20% by weight with respect to the total weight of the composition for forming the coating layer. For the above ranges, it is possible to improve the coating property and curing reactivity of the composition for forming the coating layer.

In one aspect of the present invention, the initiator may be a photoinitiator or a thermal initiator. It is preferable that the initiator may be a photoinitiator, for example, the photoinitiator may include a photo-cationic initiator. The photo-cationic initiator may initiate polymerization of the epoxysiloxane resin and epoxy-based monomer.

Specifically, the photo-cationic initiator may be, but is not limited to, any one or more selected from the group consisting of an onium salt and an organometallic salt. For example, the photo-cationic initiator may be, but is not limited to, any one or more selected from the group consisting of diaryliodonium salt, triarylsulfonium salt, aryldiazonium salt, and iron-arene complex.

In one aspect of the present invention, a content of the photoinitiator is not particularly limited, and may be, for example, 1 to 15 parts by weight with respect to 100 parts by weight of the epoxysiloxane resin. In addition, according to one aspect of the present invention, the photoinitiator may be included in an amount of 0.1 to 10% by weight and preferably 0.3 to 5% by weight with respect to the total weight of the composition for forming the coating layer. When a content of the photoinitiator is included in the above range, the hard coating layer may have excellent curing efficiency and prevent degradation in the physical property due to residual components after curing.

In one aspect of the present invention, the composition for forming the coating layer may further include, but is not limited to, any one or more additives selected from the group consisting of fillers, glidants, light stabilizers, thermal polymerization inhibitors, leveling agents, lubricants, antifouling agents, thickeners, surfactants, antifoaming agents, antistatic agents, dispersants, initiators, coupling agents, antioxidants, UV stabilizers, and coloring agents.

The hard coating layer may further include inorganic particles to impart hardness. The inorganic particles may preferably be silica and more preferably, surface-treated silica, but are not limited thereto. Here, the surface treatment may include a functional group capable of reacting with the above-described crosslinking agent.

According to one aspect of the present invention, the inorganic particles may have, but is not limited to, an average diameter of 1 to 500 nm and preferably 10 to 300 nm.

When the hard coating layer described above is formed on the conventional polyimide-based film, the rainbow phenomenon could not be avoided due to the distortion caused by light. However, the polyimide-based film according to the present invention hardly causes a rainbow phenomenon even if the hard coating layer described above is formed, and may implement excellent visibility.

In one aspect of the present invention, the window cover film may further include a base layer. The base layer may be formed on the other surface of the polyimide-based film on which the coating layer is not formed.

In one aspect of the present invention, the polyimide-based film may be manufactured as a film and then stacked on the base layer or may be stacked after applying and coating a polyamic acid resin composition, which is a precursor of the polyimide-based film, but is not particularly limited as long as the above-described stack configuration may be formed.

In one aspect of the present invention, the base layer is not particularly limited as long as it is a base film of a commonly used window cover film, but may include, for example, any one or more selected from the group consisting of an ester-based polymer, a carbonate-based polymer, a styrene-based polymer, and an acrylic-based polymer. Specifically, the base layer may include, but is not limited to, any one or more selected from the group consisting of polyethylene terephthalate, polyethylene naphthalate, polybutylene terephthalate, polybutylene naphthalate, polycarbonate, polystyrene, and polymethyl methacrylate.

In one aspect of the present invention, the base layer may be a single layer, or may be a multilayer in which two or more are stacked. Specifically, the base layer may be obtained by stacking an optical adhesive layer on an interface between two or more base films.

In one aspect of the present invention, the base layer may have a thickness of 50 to 300 μm. The base layer may have a thickness of preferably 100 to 300 μm, and more preferably 150 to 250 μm. The base layer may have the thickness as described above to satisfy mechanical properties and significantly reduce a distortion phenomenon of light when the polyimide-based film is stacked.

In one aspect of the present invention, as a specific example, the optical adhesive layer may include, but is not limited to, any one or more selected from the group consisting of an optical clear adhesive (OCA), an optical clear resin (OCR), and a pressure sensitive adhesive (PSA).

In one aspect of the present invention, the window cover film may further include a second optical adhesive layer formed on an interface between the base layer and the polyimide-based film.

Specifically, the second optical adhesive layer formed on the interface between the base layer and the polyimide-based film may be formed of a material that is the same as or different from that of the optical adhesive layer in the base layer described above, and may be formed to have a thickness of, for example, 20 to 120 μm. The second optical adhesive layer may be preferably formed to have a thickness of 20 to 80 μm. When the second optical adhesive layer is formed to have a thickness in the above range, the window cover film may implement overall excellent optical properties and a light distortion suppressing effect.

In one aspect of the present invention, the window cover film has a high surface hardness and an excellent flexibility, is lighter than tempered glass and has a more excellent durability against deformation, and is thus excellent as a window substrate on the outermost surface of a flexible display panel.

Another aspect of the present invention provides a display device including a display panel and the window cover film described above formed on the display panel.

In one aspect of the present invention, the display device is not particularly limited as long as it is a field requiring excellent optical properties, and a display panel appropriate for such a field may be selected and provided. Preferably, the window cover film may be applied to a flexible display device. As a specific example, the window cover film may be applied to, but is not limited to, any one or more image display devices selected from various image display devices such as a liquid crystal display device, an electroluminescent display device, a plasma display device, and a field emission display device.

In the display device including the window cover film of the present invention described above, display quality is excellent, and a distortion phenomenon due to light is significantly reduced, such that, in particular, a rainbow phenomenon in which a rainbow color mura occurs may be significantly suppressed and a user's eye fatigue may be minimized due to excellent visibility.

Hereinafter, the present invention will be described with reference to specific examples and comparative examples of the present invention. The following examples are intended to illustrate the technical idea of the present invention, and it will be apparent to those skilled in the art that the present invention is not limited to the above examples.

1) In-Plane Retardation

The retardation properties were measured using Axoscan (OPMF, Axometrics Inc.). A sample of an appropriate size was placed on a stage, and the in-plane retardation (Rin) was measured with respect to a wavelength of 400 nm to 800 nm. A light source having a beam size of 1 mm was used, and the sample was moved at intervals of 1 mm horizontally and vertically using an automated XY stage for an area of 100×100 mm² to measure the retardation on the front side. For each incident angle (8), the retardation was measured, which is indicated by detecting how the light of various polarization states generated from PSG (Polarization State Generator) changes as it passes through the film to be measured by PSA (Polarization State Analyzer).

2) Uniformity Measurement of In-Plane Retardation Value.

The uniformity of the in-plane retardation was measured using an Axoscan equipment equipped with an XY-Mapping Stage of Axometrics. Here, it is possible to measure the value of $R_{in}$ and the orientation angle, and the measurement target of the uniformity is the value of Rin. When measuring, the size of a specimen was 15 cm×15 cm, and the measurement points were 10EA×10EA, and 100 points were measured at uniform intervals to check the uniformity (%) as follows.

The retardation value uses the $R_{in}$ value measured using the XY-Mapping Stage as it is. In this case, when the maximum value of $R_{in}$ is $R_{max}$, the minimum value of $R_{in}$ is $R_{min}$, and the average value is $R_{ave}$, the uniformity is defined as $\{(R_{max}-R_{min})/(R_{ave}\times 2)\}\times 100$.

3) Weight Average Molecular Weight

<Weight Average Molecular Weight of Film>

The weight average molecular weight was measured by dissolving the film in DMAc eluent containing 0.05 M LiBr. Measurement was performed using gel permeation chromatography (GPC) (Waters GPC system, Waters 1515 isocratic HPLC Pump, Waters 2414 Reflective Index detector), a column was connected to Olexis, Polypore and mixed D columns, polymethylmethacrylate (PMMA STD) was used as the standard, and the analysis was performed at 35° C. at a flow rate of 1 mL/min.

4) Modulus/Elongation at Break

A modulus and an elongation at break were measured using UTM 3365 (Instron Corp.) under conditions of pulling a polyamide-imide film having a length of 50 mm and a width of 10 mm at 50 mm/min at 25° C. according to ASTM D882.

A thickness of the film was measured and the measured thickness was input into an instrument. The modulus is represented by GPa and the elongation at break is represented by %.

5) Light Transmittance

A total light transmittance was measured over an entire wavelength region of 400 to 700 nm using a spectrophotometer (Nippon Denshoku, Industries Co., Ltd., COH-400) and a single-wavelength transmittance was measured at 388 nm using an UV/Vis (Shimadzu, UV3600), with respect to a film having a thickness of 50 μm as measured according to ASTM D1746 standard. The total light transmittance is represented by %.

6) Haze

A haze was measured using a spectrophotometer (Nippon Denshoku Industries Co., Ltd., COH-400), with respect to a film having a thickness of 50 μm as measured according to ASTM D1003 standard. The haze is represented by %.

7) Yellow Index (YI) and b* Value

A yellow index and a b* value were measured using a colorimeter (Hunter Associates Laboratory, Inc., ColorQuest XE), with respect to a film having a thickness of 50 μm according to ASTM E313 standard.

8) Pencil Hardness

A pencil hardness was measured based on the case where a line of 20 mm was drawn at a speed of 50 mm/sec using a load of 750 g, this process was repeated five or more times to generate one or more scratches, with respect to a film according to JIS K5400.

Example 1

<Preparation of Polyimide Solution>

Terephthaloyl dichloride (TPC) and 2,2'-bis(trifluoromethyl)-benzidine (TFMB) in a mixed solution of dichloromethane and pyridine were added to a reactor, and the mixture was stirred at 25° C. for 2 hours under a nitrogen atmosphere. Here, a molar ratio of TPC:TFMB was set to 300:400, and the solid content was adjusted to be 10% by weight. Thereafter, the reactant was precipitated in an excess of methanol, and then the solid content obtained by filtration was dried under vacuum at 50° C. for 6 hours or more to obtain an oligomer. The prepared oligomer had a formula weight (FW) of 1670 g/mol.

N,N-dimethylacetamide (DMAc), 100 moles of the oligomer, and 28.6 moles of 2,2'-bis(trifluoromethyl)-benzidine (TFMB) were added to the reactor as a solvent and the mixture was sufficiently stirred. After confirming that the solid raw material was completely dissolved, a fumed silica (surface area 95 $m^2/g$, <1 μm) was added to DMAc in an amount of 1000 ppm relative to the solid, and dispersed and added using ultrasonic waves. 74.1 moles of cyclobutanetetracarboxylic dianhydride (CBDA) and 54.1 moles of 4,4'-hexafluoroisopropylidene diphthalic anhydride (6FDA) were sequentially added and the mixture sufficiently stirred, followed by polymerization at 40° C. for 10 hours. Here, the solid content was 20% by weight. Then, each of pyridine and acetic anhydride was sequentially added to the solution at 2.5 times the moles of the total dianhydride content, and the mixture was stirred at 60° C. for 12 hours.

After the polymerization was completed, the polymerized solution was precipitated in an excess of methanol, and then the solid content obtained by filtration was dried under vacuum at 50° C. for 6 hours or more to obtain a polyamide-imide powder. The powder was diluted and dissolved in a DMAc at 20% by weight to prepare a polyimide-based resin solution.

<Preparation of Polyimide Film with Improved Visibility>

The obtained composition for forming a polyimide-based film was coated on a PET base film, and an optical film was continuously manufactured in a drying region separated into 4 regions and a tenter stretching region separated into 5 regions.

First, the composition for forming a polyimide-based film was continuously coated on the PET base film at room temperature using a slot die, and dried in a drying region designed to have four drying regions. Here, the shear rate of the solution in the lip part of the slot die was 120 $s^{-1}$, and the air gap was set to 1.5 mm. The thickness of the coating layer was 500 μm. The coated film was transferred to a drying region. The drying was performed at 85° C. for 2 minutes in a first drying region, was dried at 115° C. for 2 minutes in a second drying region, was performed at 130° C. for 2 minutes in a third drying region, and was performed at 140° C. for 2 minutes in a fourth drying region. A content of solvent in the film passing through the drying regions was 22% by weight.

Then, the dried polyimide-based film was separated from the PET base film, and the PET base film was stretched using a pin tenter. The stretching region was partitioned into five regions, where the base film was not stretched at 150° C. in a first stretching region, a second stretching region was set to have a temperature of 170° C. and the base film was stretched in a machine direction (MD) by 102% (it means that the base film was stretched 1.02 times in the machine direction) in the second stretching region, a third stretching region was set to have a temperature of 210° C. and the base film was stretched by 102%, a fourth stretching region was set to having a temperature of 240° C. and the base film was stretched by 102.5%, and a fifth stretching region was set to have a temperature of 240° C. and the base film was stretched in multiple steps by performing shrink stretching at 2 steps stretching ratio of 100.5%. A content of solvent in the film passing through the stretching region was adjusted to be 1.8% by weight.

In the manufactured polyamide-imide film, a thickness was 50 μm, transmittance at 388 nm was 10%, a total light transmittance was 89.42%, a haze was 0.35%, a yellow index (YI) was 1.9, a b* value was 1.0, a modulus was 7.2 GPa, an elongation at break was 22.2%, a weight average molecular weight was 310,000 g/mol, a polydispersity index (PDI) was 2.1, and a pencil hardness was HB/750 g.

<Measurement of CR Value for Linear Polarization of Polyimide Film>

Figure 5:
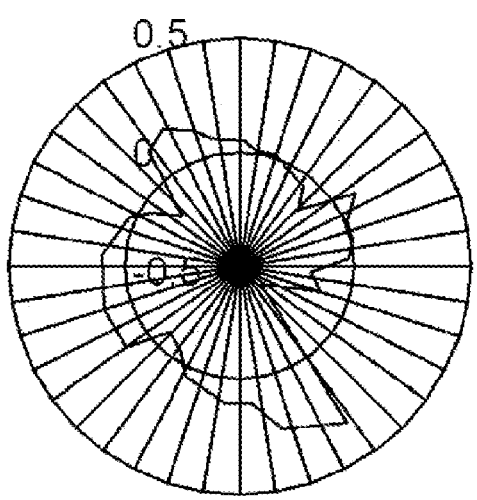
FIG. 5 is a pattern illustrating a circular retardance (CR) at an omnidirectional angle for polarized light incident at 20° according to Example 1 and Comparative Example 1.
Figure 5:
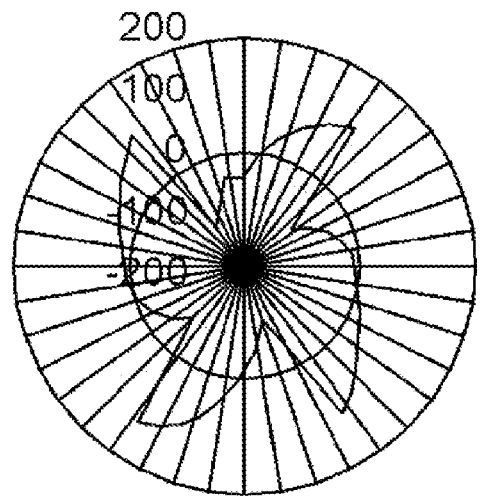
Figure 7:
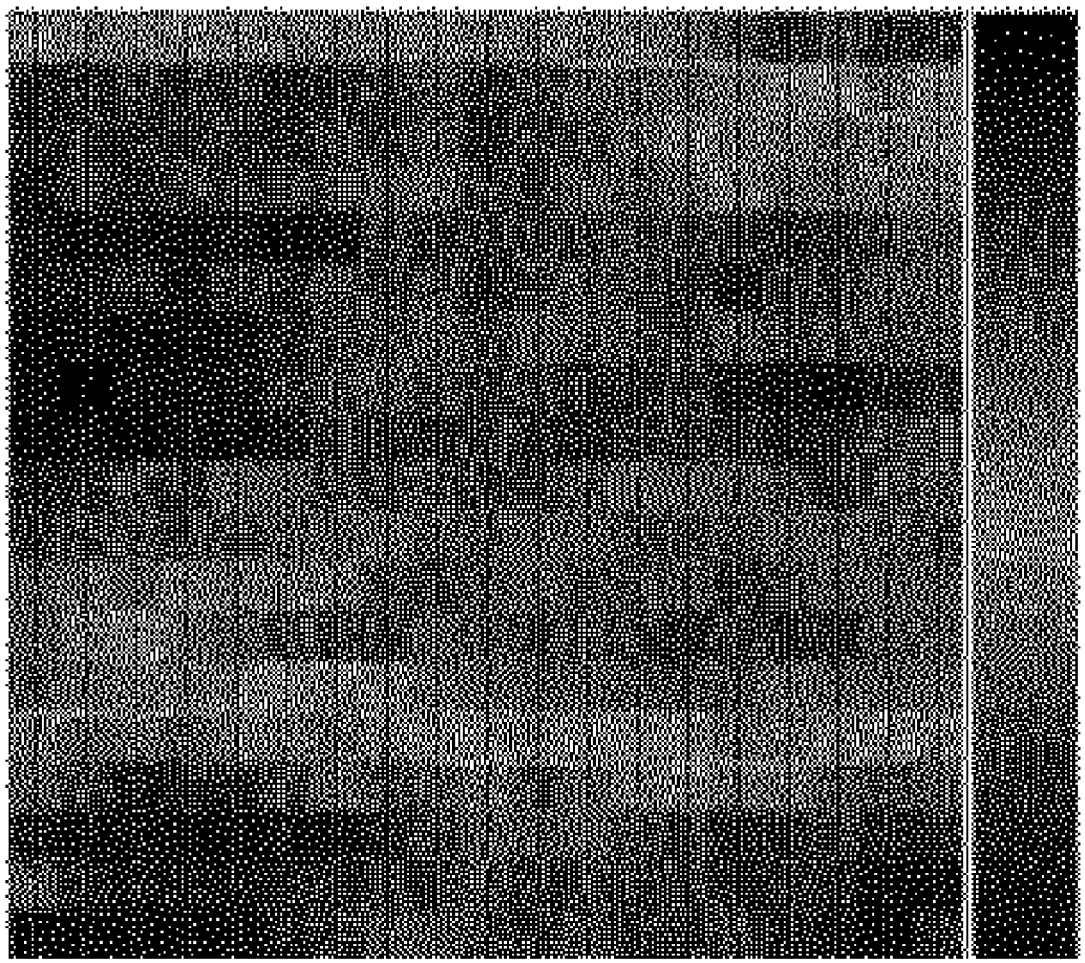
FIG. 7 is a result of evaluating in-plane retardance uniformity using XY-mapping of an Axoscan device (Axometrics Co.).

The manufactured transparent film was passed while changing the tilt angle of linear polarization of the incident light from 0 to 60° using an Axoscan device (Axometrics co.) to measure the change in the polarization state of Fast Axis depending on the omnidirectional angle (0 to 360°). Circular retardance (CR) was measured through the obtained elliptical change. As a result, it can be seen from FIG. 5 that the film exhibited the characteristics of a linear retarder when the incident CR value was between −1° and 1° at a tilt angle of 20° of the linear polarization, and also had in-plane (Rin) retardation of 300 nm or less measured using XY-Mapping of an Axoscan device (Axometrics co.). As shown in FIG. 7, the in-plane (Rin) retardation uniformity showed an excellent value of 20% or less. Here, the measured film was a product with a thickness of 30 μm. In addition, it can be seen that a film without color conversion according to the viewing angle may be obtained due to these properties, and the rainbow phenomenon did not appear at all.

Example 2

Figure 6:
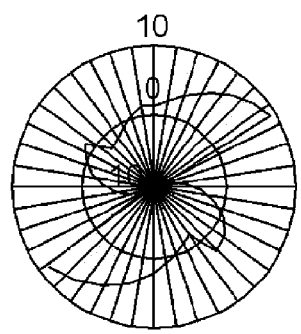
FIG. 6 is a pattern illustrating a circular retardance (CR) at an omnidirectional angle for polarized light for each wavelength incident at 20° according to Example 2 (wavelengths of incident light: 450 nm, 550 nm, 650 nm).
Figure 6:
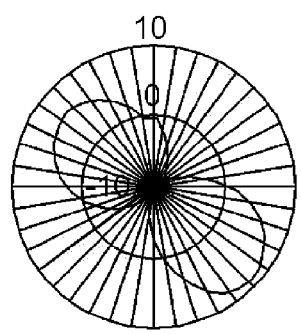
Figure 6:
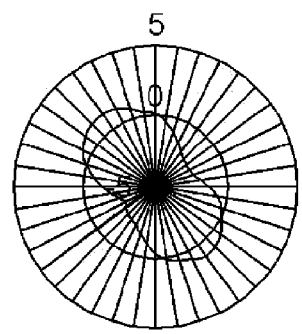

In Example 1, in the stretching step, the stretching width was stretched by 103% in the first stretching region, the stretching width was stretched by 106% in the second stretching region, the stretching width was stretched by 105% in the third stretching region, and the stretching width was stretched by 103% in the fourth stretching region, which was multi-step stretching. As a result, it can be seen from FIG. 6 that the CR value is between −7° and 7°, indicating a small change in color dispersion (color band). Here, it can be seen that the CR, which is the circular retardance value at the omnidirectional angle, is less than 10° even for the light sources for various wavelengths (450, 550, 650 nm) incident at 20°. In this case, the rainbow phenomenon by the film hardly appeared.

Example 3

Example 3 was performed in the same manner as in Example 1, except that in the drying step, the temperature of the fourth drying region was maintained at 130° C. and set to the same temperature as that of the third drying region. As a result, the CR value was between −4° and 4°, and the change in color dispersion (color band) was small.

Comparative Example 1

Figure 3:
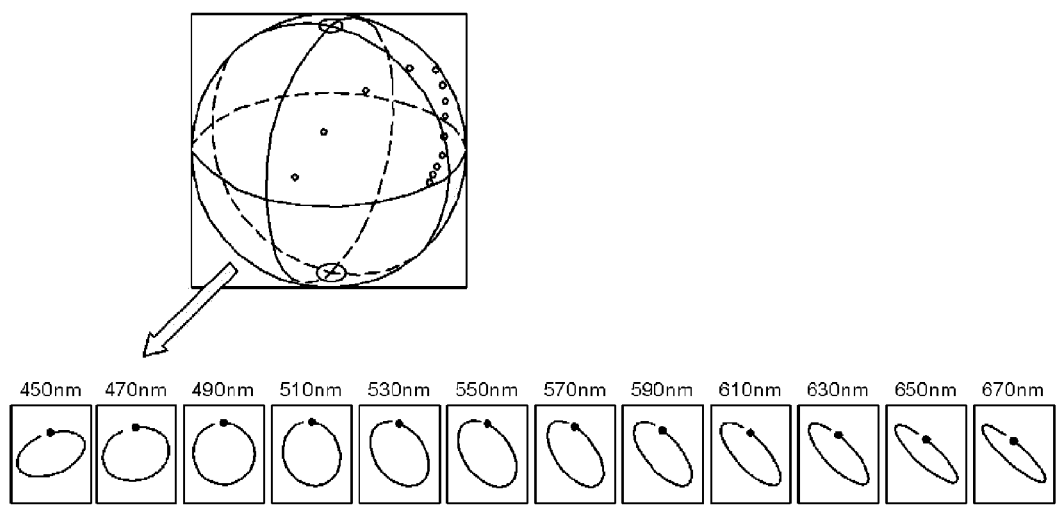
Figure 4:
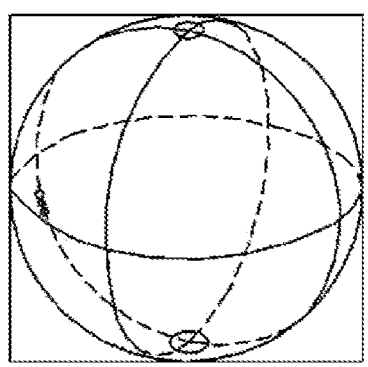
Figure 4:
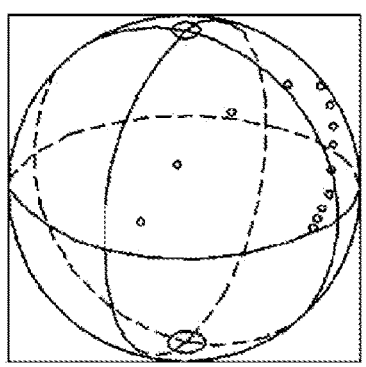
Figure 4:
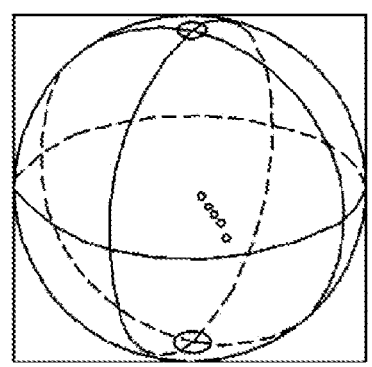

Comparative Example 1 was performed in the same manner as in Example 1, except that the drying region was partitioned into 3 steps, where the first drying region was set at 130° C. for 3 minutes, the second drying region was set at 140° C. for 2 minutes, the third drying region was set at 130° C. for 3 minutes, the final solvent content was 16% by weight, and after the stretching step, the solvent content was 2.3%. That is, it was programmed so that the drying temperature does not rise in each step. As a result, it could be seen from FIG. 3 that the CR value was −100° to 100°, and thus the rainbow phenomenon was strongly recognized.

Comparative Example 2

In Example 1, the shear rate of the solution in the lip part of the slot die was 2 s-1, and the air gap was set to 10 mm. The thickness of the coating layer was 500 μm. In addition, the temperature of the fourth drying region was set to 150° C., the residence time was set to 3 minutes, and the content of the solvent was set to 11% by weight. As a result, it could be seen that the CR value was −150° to 150°, and thus the rainbow phenomenon was strongly recognized.

Example 4

Example 4 was performed in the same manner as in Example 1, except that the stretching width was shrunk and stretched by 110% in the second stretching region, the stretching width was shrunk and stretched by 108% in the third stretching region, and the stretching width was shrunk and stretched by 107% in the fourth stretching region. As a result, it could be seen that the CR value was −30° to 30°, and thus the rainbow phenomenon was hardly confirmed.

Comparative Example 3

Comparative Example 3 was performed in the same manner as in Example 4, except that the third stretched region and the fourth stretched region were not shrunk and stretched. As a result, it could be seen that the CR value was −100° to 100°, and thus the rainbow phenomenon was strongly recognized.

Comparative Example 4

In Example 1, the shear rate of the solution in the lip part of the slot die was 120 s$^{-1}$, and the air gap was set to 6.6 mm. It was manufactured as follows without drying and stretching conditions. That is, the obtained composition for forming a polyimide-based film was subjected to solution casting on a glass substrate using a bar coating method. Thereafter, after heat treatment at 230° C. for 30 minutes in a vacuum oven, the film was cooled at room temperature and the film formed on the glass substrate was separated from the substrate to obtain a polyamide-imide film with a thickness of 35 μm. The CR values of the omnidirectional angles for each incident angle of the film ranged from −100° to 100°.

Accordingly, in the optical film according to the present invention, the CR value was remarkably reduced, preferably between −1° and 1° and the viewing angle was significantly reduced, which means that it is possible to provide a display device capable of remarkably improving the rainbow phenomenon in which iridescent mura are generated and minimizing the user's eye fatigue due to excellent visibility.

Hereinabove, although the present invention has been described by specific matters and the limited embodiments, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, and the claims and all of the modifications equal or equivalent to the claims are intended to fall within the scope and spirit of the present invention.

The invention claimed is:

1. A polyimide-based film of which a circular retardance value with respect to an omnidirectional angle of 0° to 360° is −30° to 30° when incident light passes through the polyimide-based film in a state in which a tilt angle of linear polarization of the incident light with respect to a thickness direction of the polyimide-based film is 0 to 60°,
   wherein the polyimide-based film has a polyamide-imide structure, and
   wherein the polyimide-based film includes a unit derived from a fluorine-based aromatic diamine, a unit derived from an aromatic dianhydride, a unit derived from an aromatic diacid dichloride, and a unit derived from a cycloaliphatic dianhydride.

2. The polyimide-based film of claim 1, wherein the circular retardance value is −10° to 10°.

3. The polyimide-based film of claim 2, wherein the circular retardance value is −1° to 1°.

4. The polyimide-based film of claim 1, wherein the polyimide-based film has in-plane retardation (Rin) of 500 nm or less as measured at 400 nm to 800 nm using an Axoscan equipment, and uniformity of the in-plane retardation within ±20%.

5. The polyimide-based film of claim 4, wherein the polyimide-based film has uniformity within ±10%.

6. The polyimide-based film of claim 1, wherein
   the polyimide-based film has a modulus of 3 GPa or more and an elongation at break of 8% or more as measured according to ASTM D822, and a light transmittance of 5% or more measured at 388 nm, a total light transmittance of 87% or more measured at 400 to 700 nm, a haze of 2.0% or less, a yellowness of 5.0 or less, and a b* value of 2.0 or less as measured according to ASTM D1746.

7. The polyimide-based film of claim 1, wherein the polyimide-based film has a thickness of 30 to 110 μm.

8. A window cover film, comprising: the polyimide-based film of claim 1; and
   a coating layer formed on the polyimide-based film.

9. The window cover film of claim 8, wherein
   the coating layer is any one or more selected from a hard coating layer, an anti-static layer, an anti-fingerprint layer, an anti-fouling layer, an anti-scratch layer, a low refractive layer, an anti- reflection layer, and an impact absorbing layer.

10. A flexible display panel comprising the polyimide-based film of claim 1.

* * * * *

UNITED STATES PATENT AND TRADEMARK OFFICE
CERTIFICATE OF CORRECTION

| | | |
|---|---|---|
| PATENT NO. | : 12,305,002 B2 | Page 1 of 1 |
| APPLICATION NO. | : 17/764678 | |
| DATED | : May 20, 2025 | |
| INVENTOR(S) | : Minsang Park | |

It is certified that error appears in the above-identified patent and that said Letters Patent is hereby corrected as shown below:

On the Title Page

Column 1, Item (72) Inventors, Line 4, delete "Jeong" and insert -- Jeon --

Signed and Sealed this
Sixteenth Day of December, 2025

John A. Squires
*Director of the United States Patent and Trademark Office*